United States Patent [19]

Davis et al.

[11] Patent Number: 4,751,414

[45] Date of Patent: Jun. 14, 1988

[54] DYNAMIC BRAKING CIRCUIT FOR UNIVERSAL MOTOR

[76] Inventors: Richard S. Davis, 456 W. Charleston, Palo Alto, Calif. 94306; Allen F. Podell, 1251 Harker St., Palo Alto, Calif. 94301

[21] Appl. No.: 42,401

[22] Filed: Apr. 24, 1987

[51] Int. Cl.$^4$ .............................................. H02P 3/08
[52] U.S. Cl. ...................................... 310/93; 318/381
[58] Field of Search ................... 310/77, 93, 105, 118; 318/87, 364, 368, 375, 376, 377, 378, 379, 380, 381

[56] References Cited

U.S. PATENT DOCUMENTS

| 2,507,918 | 5/1950 | Mageoch | 318/381 |
| 4,144,482 | 3/1979 | Schwab | 318/381 |
| 4,445,596 | 5/1984 | Waters et al. | 310/93 |

FOREIGN PATENT DOCUMENTS 846161  9/1939  France ................... 318/381

Primary Examiner—Patrick R. Salce
Assistant Examiner—D. L. Rebsch
Attorney, Agent, or Firm—Townsend and Townsend

[57] ABSTRACT

A dynamic braking circuit for a universal motor is disclosed. A switching mechanism is used to reverse the orientation of the series field winding with respect to the rotor when power is removed. Because the rotor acts as a generator when power is removed, it will generate current to the field winding. Because the orientation of the field winding has been reversed, the field winding will thus try to make the motor run in the opposite direction, thereby exerting a braking force on the motor. The amount of the braking force is limited by using a portion of a second winding to oppose the reversed action of the first winding.

3 claims, 4 Drawing Sheets

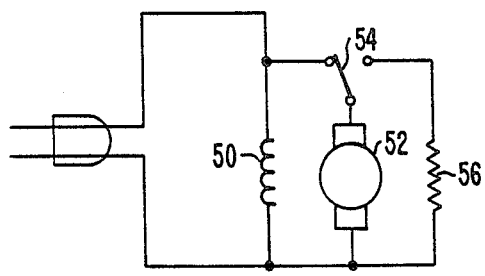
FIG._1A.   PRIOR ART
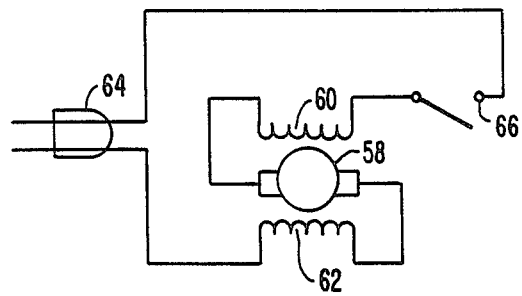
FIG._1B.   PRIOR ART
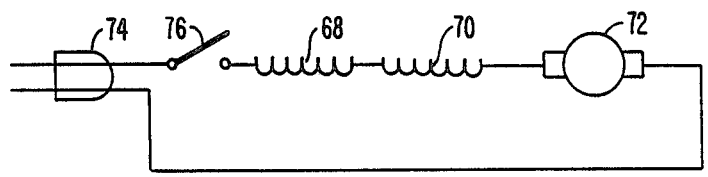
FIG._1C.   PRIOR ART

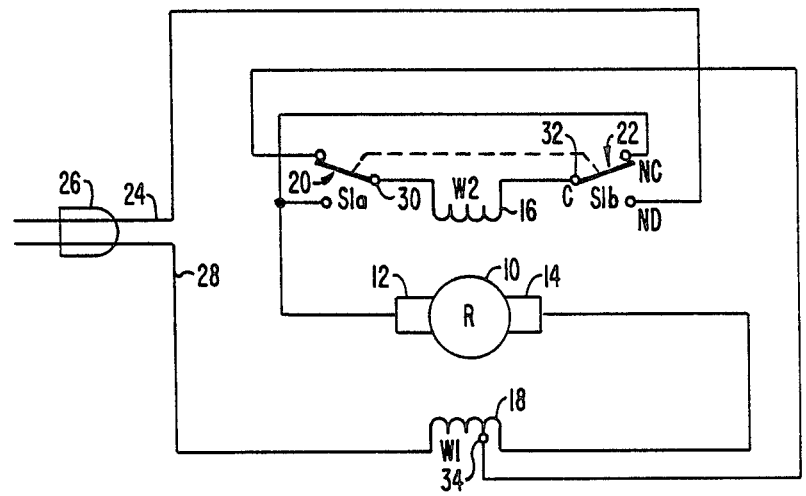
FIG._2.
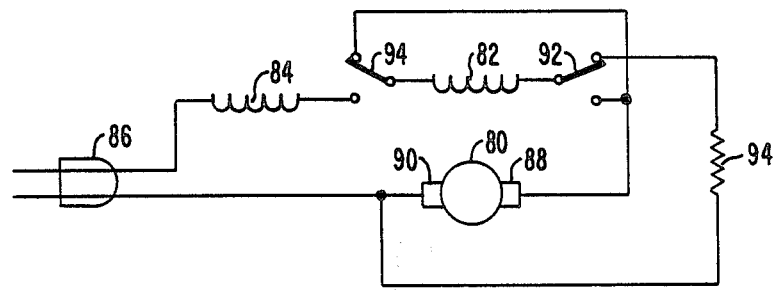
FIG._4.

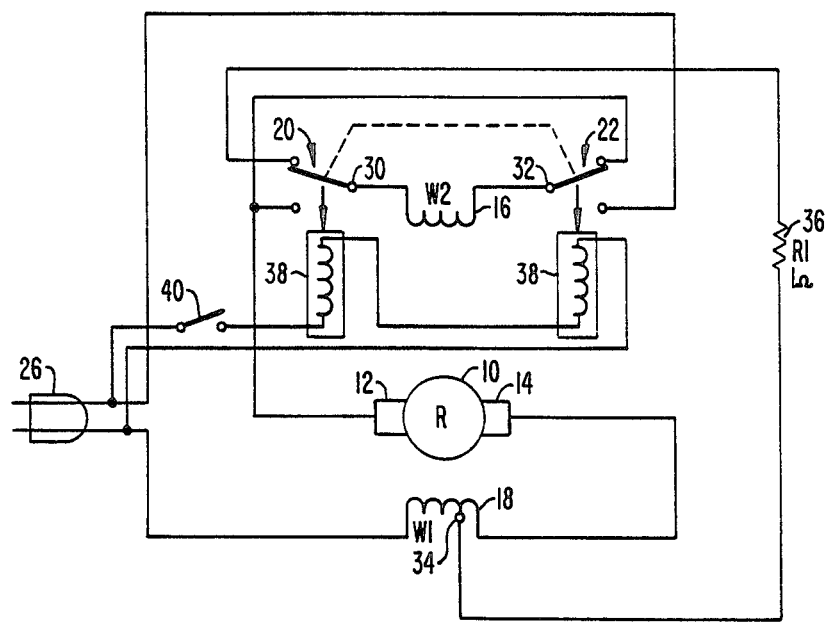
FIG._3.

DYNAMIC BRAKING CIRCUIT FOR UNIVERSAL MOTOR

BACKGROUND

The present invention relates to braking circuits for universal motors.

Universal motors are fractional horsepower AC motors specially designed for use on either AC or DC power. These motors have a commutator similar to those used in DC motors, a rotor winding constructed in a manner compatible for AC or DC use, and at least one field winding in series with the rotor winding. Universal motors are commonly used in household appliances such as vacuum cleaners, hand drills, saws, blenders, etc. These motors are constructed so they can be used in areas where only DC power is available in addition to areas where AC power is available.

When a universal motor is turned off by removing power, the motor continues to spin due to the inertia of the rotor. This continued spinning can be undesirable and even hazardous in some applications, such as a power saw where it would be desirable to have the blade stop once the saw is switched off. A braking force can be applied to a saw blade by a mechanical brake pad which is activated by the removal of power.

Dynamic braking is used for some DC motors using a shunt field winding as shown in FIG. 1A. A shunt field winding 50 is in parallel with a rotor 52 rather than being in series with it. In this arrangement, a switch 54 can be used to disconnect shunt winding 50 in parallel with the rotor and substitute a resistance 56 in parallel with the rotor when power is removed to stop the rotor. The rotor, which continues to spin due to inertia, acts as an electrical generator when power is removed. By switching this resistance in parallel with the rotor, an electric load is applied to the generator, causing the motor to function as a loaded generator and develop a retarding torque that will rapidly stop the motor.

SUMMARY OF THE INVENTION

The present invention is a dynamic braking circuit for a universal motor. A switching mechanism is used to reverse the orientation of the series field winding with respect to the rotor when power is removed. Because the rotor acts as a generator when power is removed, it will generate current in the field winding. Because the orientation of the field winding has been reversed, the field winding will thus try to make the motor run in the opposite direction, thereby exerting a braking force on the motor.

In the preferred embodiment, the switching mechanism taps into an intermediate tap of a second series field winding so that a portion of the second field winding will generate a force on the rotor which opposes the force of the first field winding, thus limiting the braking force. Without such current limiting, the motor can stop abruptly, causing it to jerk violently.

In an alternate construction, a resistance is included to limit the current through the field winding and thus limit the braking force. This resistance can be applied by using a standard resistor, preferably approximately 1 ohm.

An alternate construction eliminating the need for an intermediate tap alters the number of turns in each of the two series windings, so that a portion of what would normally be the second winding is electrically connected as a part of the first winding. In this configuration, no center tap is needed, and the entire second winding is used to oppose the action of the first winding.

The switching mechanism can be one or more switches or relays which hold the field windings in their normal configuration when power is applied to the switch or relay, but switch to the braking configuration when power is removed from the relay.

For a fuller understanding of the nature and advantages of the invention, reference should be made to the ensuing detailed description taken in conjunction with the accompanying drawings.

BRIEF DESCRIPTION OF THE DRAWINGS

FIG. 1A is a schematic diagram of a prior art dynamic braking circuit using a shunt field winding;

FIGS. 1B and 1C are schematic diagrams showing prior art series connected motors with the windings electrically on opposite sides and on the same side, respectively, of the rotor;

FIG. 2 is a schematic diagram of a preferred embodiment of a dynamic braking system according to the present invention using an intermediate tap on the second field winding: and FIG. 3 is a schematic diagram of the circuit of FIG. 2 including a current limiting resistance.

DETAILED DESCRIPTION OF THE PREFERRED EMBODIMENT

FIG. 1B shows a prior art series wound motor in which the rotor 58 has windings 60 and 62 on opposite sides. Power is supplied through an outlet 64 and is interrupted by a switch 66 when the motor is stopped.

FIG. 1C shows a series wound prior art motor in which both windings 68 and 70 are electrically on the same side of rotor 72, although physically they are on opposite sides. Again, an outlet 74 provides power which is interrupted by a switch 76 when the motor is shut off.

A preferred embodiment of the present invention is shown in FIG. 2. FIG. 2 shows a rotor 10 which is provided power through a pair of brushes 12, 14. In series with rotor 10 are equal windings 16, 18 which are electrically on opposite sides of rotor 10. Switches 20 and 22 couple winding 16 between brush 12 and a first lead 24 of power source 26. Winding 18 is coupled between brush 14 and a second lead 28 of power source 26.

When power is removed from power source 26, switches 20 and 22 shift into the position shown in FIG. 2 to remove the connection between a first end 30 of winding 16 and brush 12, and also to remove the connection between a second end 32 of winding 16 and power supply connector 24. Winding 16 is then connected so that end 30 is coupled to an intermediate tap 34 of winding 18 and second end 32 of winding 16 is coupled to brush 12.

In this configuration, the electrical current generated by the continued movement of rotor 10 after power is removed flows through coil 16 in a direction opposite to the direction of current when power is supplied from power source 26. Thus, coil 16 will operate to produce a magnetomotive force (mmf) which attempts to rotate rotor 10 in an opposite direction, thus braking rotor 10. At the same time, current generated by rotor 10 also flows through a small portion of winding 18 in the same direction that current would flow when the current is produced by power supply 26. Thus, this portion of winding 18 produces a force which would tend to keep rotor 10 moving in the same direction, and thus opposes the force produced by winding 16. This limits the speed of the braking of rotor 10, to prevent an abrupt stop of rotor 10. Such an abrupt stop is undesirable in certain appliances, such as a power saw, where an abrupt stop could cause the saw to jerk out of the user's hand and cause injury.

FIG. 3 shows the same circuit as FIG. 2 with the addition of a resistance 36. Resistance 36 can be used in addition to the intermediate tap of coil 18 as shown in FIG. 3, or in place of the intermediate tap, to limit the current through winding 16 and thus limit the braking force. Alternately, tap 34 could be chosen to be closer to rotor 10 than in the configuration of FIG. 2, so that the combination of intermediate tap 34 and resistor 36 produce the same force as the larger number of windings by the intermediate tap of FIG. 2.

As shown in FIG. 3, switches 20 and 22 can be activated by a relay 38. Although shown as two relays for the purpose of the schematic, preferably a single relay is used. This relay receives current from power supply 26 and is activated by the motor on/off switch 40. Relay 38 couples coil 16 in the normal operating position when power is applied. When power is removed, the relay is deactivated and the swtich moves to the position shown in FIG. 3 to couple in the braking circuit.

As will be understood by those familiar with the art, the present invention may be embodied in other specific forms without departing from the spirit or essential characteristics thereof. For example, a mechanical switch connected to the on/off switch could be used in place of relay 38 of FIG. 3. Accordingly, the disclosure of the preferred embodiments of the invention is intended to be illustrative, but not limiting, of the scope of the invention which is set forth in the following claims.

What is claimed is:

1. A braking circuit for a universal motor having a field winding in series with a rotor, a first end of said field winding being coupled to a first connection to said rotor, a second field winding in series with said rotor, said second field winding being coupled to a second connection to said rotor, comprising:

an intermediate tap to said second field winding;

switching means for reversing the orientation of said field winding such that said field winding is in series with said rotor with a second end of said field winding being coupled to said first connection to said rotor, and for coupling said intermediate tap of said second field winding to said first end of said first-mentioned field winding; and means for causing said switching means to reverse the orientation of said field winding responsive to the removal of power to said rotor.

2. The braking circuit of claim 1 wherein said switching means comprises a relay.

3. The braking circuit of claim 1 further comprising a resistance coupled between a second connection of said rotor and said switching means.

* * * * *